United States Patent
Ahmad et al.

(10) Patent No.: US 11,281,618 B2
(45) Date of Patent: Mar. 22, 2022

(54) METHODS AND CIRCUITS FOR DEADLOCK AVOIDANCE

(71) Applicant: Xilinx, Inc., San Jose, CA (US)

(72) Inventors: Sagheer Ahmad, Cupertino, CA (US); Tomai Knopp, San Jose, CA (US)

(73) Assignee: XLNX, INC., San Jose, CA (US)

( * ) Notice: Subject to any disclaimer, the term of this patent is extended or adjusted under 35 U.S.C. 154(b) by 797 days.

(21) Appl. No.: 14/530,561

(22) Filed: Oct. 31, 2014

(65) Prior Publication Data
US 2016/0124891 A1     May 5, 2016

(51) Int. Cl.
| | | |
|---|---|---|
| *G06F 13/42* | (2006.01) | |
| *G06F 13/16* | (2006.01) | |
| *G06F 12/0831* | (2016.01) | |
| *G06F 12/0804* | (2016.01) | |
| *G06F 12/0888* | (2016.01) | |
| *G06F 13/40* | (2006.01) | |

(52) U.S. Cl.
CPC ...... *G06F 13/4282* (2013.01); *G06F 12/0804* (2013.01); *G06F 12/0833* (2013.01); *G06F 12/0888* (2013.01); *G06F 13/1642* (2013.01); *G06F 13/1673* (2013.01); *G06F 13/4036* (2013.01); *Y02D 10/00* (2018.01)

(58) Field of Classification Search
CPC ............. G06F 13/4036; G06F 13/1673; G06F 13/4282; G06F 13/0888; G06F 13/14; G06F 12/0804; G06F 12/0833; G06F 12/0888
See application file for complete search history.

(56) References Cited

U.S. PATENT DOCUMENTS

| | | | | |
|---|---|---|---|---|
| 5,659,709 | A * | 8/1997 | Quach | G06F 12/0831 711/141 |
| 5,953,538 | A * | 9/1999 | Duncan | G06F 12/0831 710/22 |
| 6,243,781 | B1 | 6/2001 | Gandhi | |
| 6,757,768 | B1 * | 6/2004 | Potter | G06F 13/36 710/112 |
| 7,219,175 | B1 * | 5/2007 | Davis | G06F 13/4059 710/105 |
| 9,996,484 | B1 * | 6/2018 | Davis | G06F 13/105 |
| 2003/0053468 | A1 * | 3/2003 | Deng | G06F 13/4036 370/402 |

(Continued)

FOREIGN PATENT DOCUMENTS

EP     0944001     9/1999

*Primary Examiner* — Zachary K Huson
(74) *Attorney, Agent, or Firm* — Crawford Maunu PLLC (57) ABSTRACT

A system is disclosed that includes a first communication circuit that communicates data over a first data port using a first communication protocol. The system also includes a second communication circuit that communicates data over a second data port using a second communication protocol. The second communication protocol processes read and write requests in an order that the read and write requests are received. A bridge circuit is configured to communicate data between the first data port of the first communication circuit and the second data port of the second communication circuit. The bridge circuit is configured to communicate non-posted writes to the second communication circuit via a buffer circuit and communicate posted writes to the second communication circuit via a communication path that bypasses the buffer circuit.

16 Claims, 4 Drawing Sheets

(56) References Cited

U.S. PATENT DOCUMENTS

| | | | |
|---|---|---|---|
| 2003/0135685 A1 | 7/2003 | Cowan | |
| 2003/0200383 A1* | 10/2003 | Chui | G06F 13/4217 711/112 |
| 2005/0030963 A1* | 2/2005 | Solomon | H04L 47/39 370/428 |
| 2005/0182869 A1* | 8/2005 | Lee | G06F 12/0638 710/55 |
| 2007/0055808 A1* | 3/2007 | Asaro | G06F 13/4027 710/315 |
| 2009/0037616 A1* | 2/2009 | Brownell | G06F 13/4221 710/29 |
| 2010/0281193 A1* | 11/2010 | Kojima | G06F 13/4059 710/52 |
| 2014/0082238 A1* | 3/2014 | Ahmad | G06F 13/42 710/110 |

* cited by examiner

METHODS AND CIRCUITS FOR DEADLOCK AVOIDANCE

FIELD OF THE INVENTION

The disclosure generally relates to integrated circuits (ICs) and more particularly to data communication.

BACKGROUND

Programmable integrated circuits (ICs) are devices that can be programmed to perform specified logic functions. One type of programmable IC, the field programmable gate array (FPGA), typically includes an array of programmable tiles. Each programmable tile may include both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth. The programmable interconnect and programmable logic are typically programmed by loading a configuration data stream into internal configuration memory cells that define how the programmable elements are configured. The configuration data can be read from memory (e.g., from an external PROM) or written into the FPGA by an external device. The collective states of the individual memory cells then determine the function of the FPGA.

Some programmable ICs include an embedded processor that is capable of executing program code. The processor can be fabricated as part of the same die that includes the programmable logic circuitry and the programmable interconnect circuitry, also referred to collectively as the "programmable circuitry" of the IC. It should be appreciated that execution of program code within a processor is distinguishable from "programming" or "configuring" the programmable circuitry that may be available on an IC. The act of programming or configuring programmable circuitry of an IC results in the implementation of different physical circuitry as specified by the configuration data within the programmable circuitry.

Programmable ICs having embedded processor systems often include operating memory, software instruction storage, input/output, and other components of a computer system and are sometimes referred to as system on chip (SOC) solutions. Designers may implement complex functions in programmable logic to increase efficiency and throughput. This architectural combination gives an advantageous mix of serial and parallel processing, flexibility, and scalability, thereby enabling a more optimized system partitioning—especially in the areas of intelligent video, digital communications, machine systems, and medical devices.

Given the variety of options available to designers, a design may include several portions split between software and programmable logic of one or more integrated circuits. However, implementing a suitable arrangement for communication between different portions poses a challenge to designers. Data bus architectures provide a convenient method to communicate data between the various portions of a system as well as with external devices.

Data busses may be implemented with a number of different data bus protocols such as the Peripheral Component Interconnect (PCI), PCI Express (PCIe), the Advanced Microcontroller Bus Architecture (AMBA), etc. Designers implement interface circuits to communicate data to and from the data bus in a manner compliant with the chosen data bus protocol.

SUMMARY

A system is disclosed that includes a first communication circuit that communicates data over a first data port using a first communication protocol. The system also includes a second communication circuit that communicates data over a second data port using a second communication protocol. The second communication protocol processes read and write requests in an order that the read and write requests are received. A bridge circuit is configured to communicate data between the first data port of the first communication circuit and the second data port of the second communication circuit. The bridge circuit is configured to communicate non-posted writes to the second communication circuit via a buffer circuit and communicate posted writes to the second communication circuit via a communication path that bypasses the buffer circuit.

A method for data communication is also disclosed. Using a first communication circuit, data is communicated over a first data bus using a first communication protocol. Using a second communication circuit, data is communicated over a second data bus using a second communication protocol that processes read and write requests in an order that the read and write requests are received. Non-posted writes are communicated from the first communication circuit to the second communication circuit via a buffer circuit. Posted writes are communicated from the first communication circuit to the second communication circuit via a communication path that bypasses the buffer circuit.

Another system is also disclosed that includes a first communication circuit that communicates data over a first data port using a first communication protocol. The system also includes a second communication circuit that communicates data over a second data port using a second communication protocol that processes read and write requests in an order that the read and write requests are received. The system also includes bridge circuit. The bridge circuit has a first communication path between the first and second data ports that include a buffer circuit. The bridge circuit also has a second communication path between the first and second data ports that bypasses the buffer circuit. The bridge circuit includes an input circuit configured to determine if a write transaction received from the first communication circuit is a posted write or a non-posted write. In response to determining the write transaction is a non-posted write, the input circuit provides the non-posted write to the second communication circuit via the second communication path. In response to determining the write transaction is a posted write, the input circuit provides the posted write to the second communication circuit via the second communication path.

Other features will be recognized from consideration of the Detailed Description and Claims, which follow.

BRIEF DESCRIPTION OF THE DRAWINGS

Various aspects and features of the disclosed methods and circuits will become apparent upon review of the following detailed description and upon reference to the drawings in which.

DETAILED DESCRIPTION OF THE DRAWINGS

Programmable ICs may include circuits which communicate data using different respective communication protocols. For example, a programmable IC may use the AXI communication protocol to communicate data between different portions of a system on a first bus, and use the PCIe communication protocol to communicate with external devices connected to an I/O port of the system. When communicating data between circuits that use different communication protocols, an interface circuit may be employed to convert data between the data formats used by each of the protocols.

However, due to ordering rules employed by various communication protocols, a deadlock situation may occur in which each communication circuit requires data from the other before the communication circuit can continue processing. For instance, deadlock may occur when a data channel from an AXI device to a PCIe device becomes blocked by a non-posted write. Non-posted writes require that a receiving device respond with an acknowledgement, to indicate success or failure of the transaction, before the sending device may proceed with the next data transaction. Non-posted writes may include, for example, I/O writes, and/or configuration writes. In contrast, a posted write is a write transaction that does not require an acknowledgment before proceeding with other transactions. Posted writes may include, for example, memory writes and/or data messages. For ease of reference, posted and non-posted read and writes may be generally referred to as data transactions.

Some approaches may prevent deadlock between an AXI device and a PCIe device by buffering all downstream data transactions from the AXI device in a bridge circuit until the downstream PCIe device is ready to process additional data transactions. By buffering the data transactions, ordering rules can be preserved, while allowing the AXI device to continue issuing new data transactions. More specifically, the AXI device may issue data transactions necessary to complete any pending upstream data transactions that may block an upstream acknowledgment from the PCIe device. However, the number of downstream transactions that may be buffered is limited by the buffer storage available in the bridge circuit. Moreover, depending on the application, a large number of downstream read/write transactions may be received while waiting for a non-posted write to complete.

A system is disclosed that includes a deadlock resistant bridge circuit for communicating data between a first device, which communicates data using a first communication protocol (e.g., AXI), and a second device that communicates data using a second communication protocol (e.g., PCIe). The bridge circuit is configured to communicate data with the first communication circuit using the first communication protocol, and communicate data with the second communication circuit using the second communication protocol. At least one of the communication protocols is configured to process read and write requests in an order that the read and write requests are received. The bridge is configured to prevent deadlock by communicating downstream non-posted writes to the second device via a buffer. Other downstream read/write requests are communicated from the first device to the second device without buffering. In this approach, fewer data transactions need to be buffered in comparison to approaches that buffer all downstream data transactions. Accordingly, the buffer size may be reduced—thereby reducing manufacturing costs.

The disclosed circuits and methods may be used for communicating data between circuits using various communication protocols. However, for ease of explanation, the examples and implementations are primarily described with reference to the communication of data between an AXI device and a PCIe device.

Figure 1:
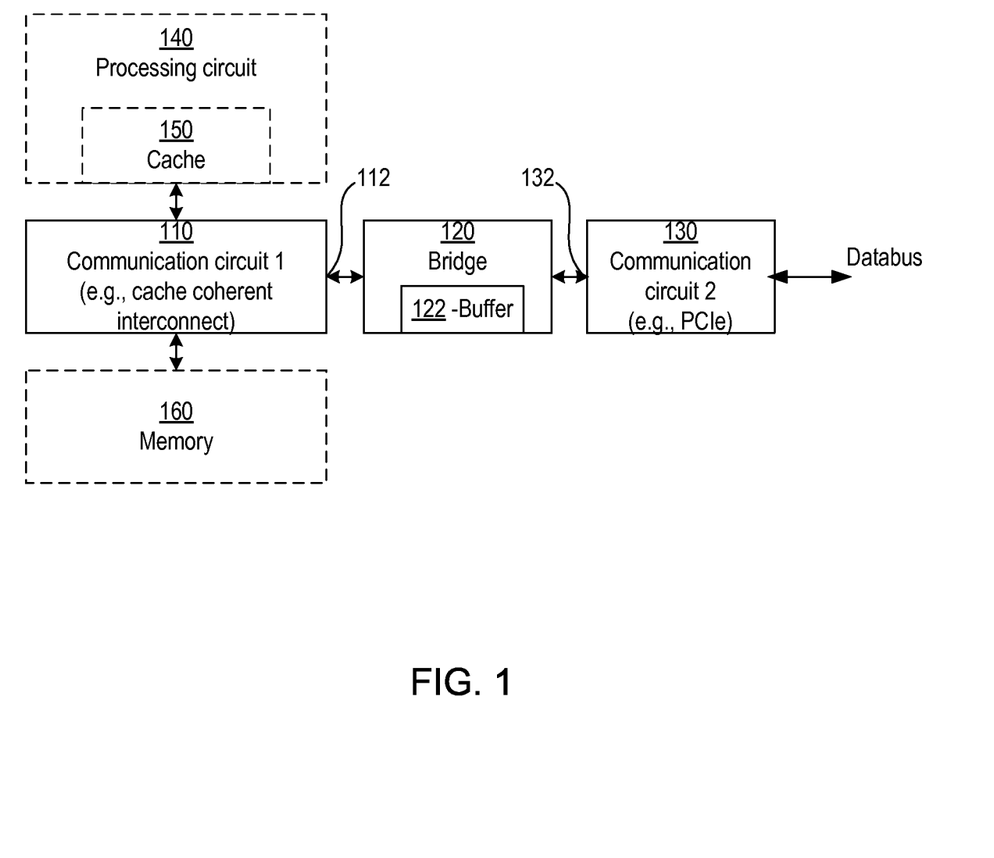
FIG. 1 shows a system having a communication bridge circuit, consistent with one or more implementations.

Turning now to the figures, FIG. 1 shows a system having a communication bridge circuit 120 in accordance with one or more implementations. The system includes a first communication circuit 110 configured to communicate via a first data port 112 using a first communication protocol (e.g., AXI). The system also includes a second communication circuit 130 configured to communicate data over a second data port 132 using a second communication protocol (e.g., PCIe), which processes read and write requests in an order that the read and write requests are received.

The bridge circuit 120 is configured to communicate data between the first data port of the first communication circuit and the second data port of the second communication circuit. The bridge circuit 120 is configured to communicate data with the first communication circuit 110 using the first communication protocol and communicate data with the second communication circuit 130 using the second communication protocol.

Figure 2:
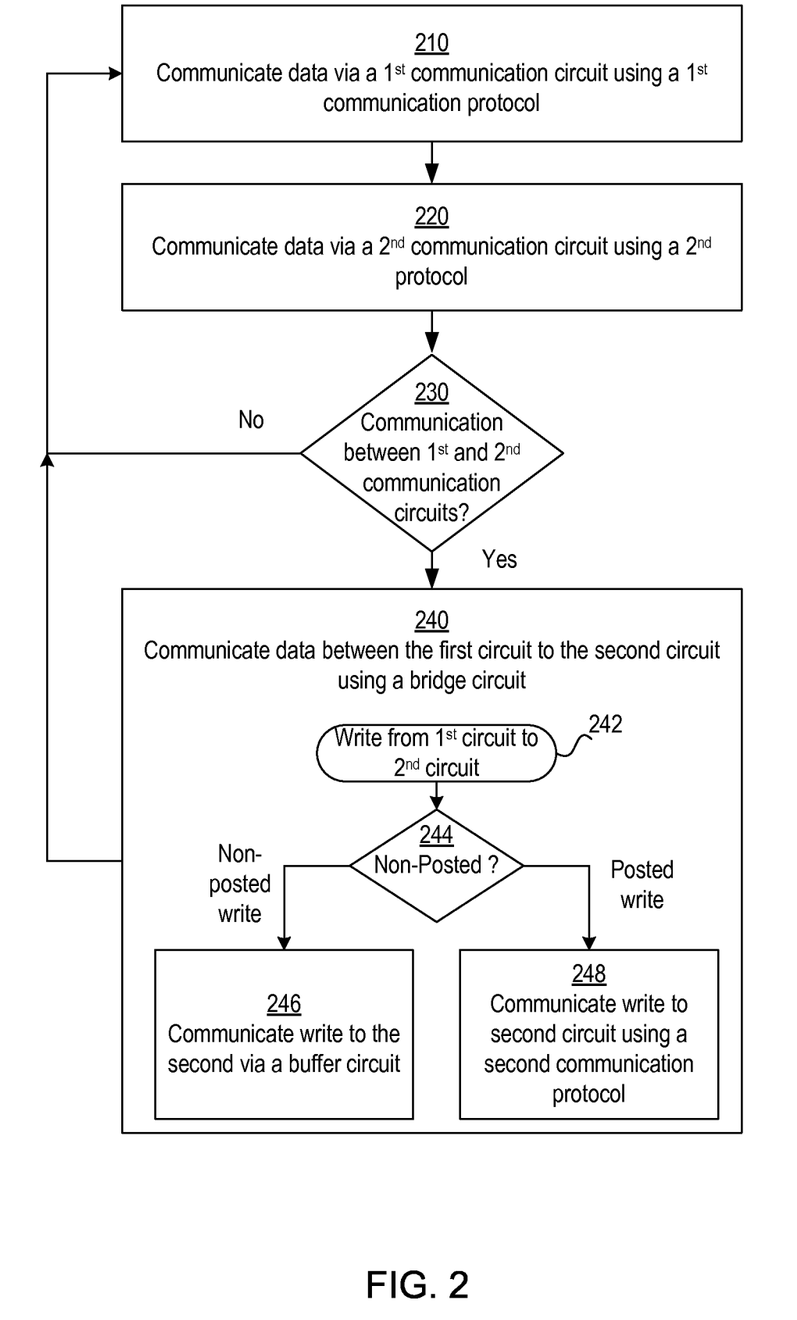
FIG. 2 shows a process for operating first and second communication circuits and a communication bridge circuit, consistent with one or more implementations.

FIG. 2 shows a process for operating first and second communication circuits and a communication bridge circuit, consistent with one or more implementations. For ease of explanation, FIG. 1 and FIG. 2 are discussed together. At block 210, data is communicated by the first communication circuit 110 using the first communication protocol. At block 220 data is communicated by the second communication circuit 130. Communication performed at blocks 210 and 220 may transmit data to or receive data from various circuits including, for example, the first and second communication circuits 110 and 130, process circuit 140, memory 160, and/or external circuits. If the data communicated by the first and second communication circuit is for a communication between the first and second communication circuit, decision block 230 directs the process to block 240. Otherwise, decision block 230 directs the process back to block 210.

At block 240, data is communicated between the first and second communication circuits using the bridge circuit 120. The bridge circuit 120 communicates data between the first and second communication circuits by converting data messages/packets between the respective data formats used by the two communication protocols. The bridge circuit 120 communicates write transactions 242 from the first communication circuit 110 to the second communication circuit 130 differently depending on whether or not the write transaction is a posted write transaction or a non-posted write transaction. For a non-posted write transaction, decision block 244 causes the bridge circuit 120 to communicate the non-posted write transaction from the first communication circuit 110 to the second communication circuit 130 via a buffer circuit 122, at block 246. For a posted write transaction, decision block 244 causes the bridge circuit 120 to communicate posted writes to the second communication circuit 130, at block 248, using a communication path that bypasses the buffer circuit 122. As indicated above, buffering of the non-posted writes from the first communication circuit 110 to the second communication circuit 130 helps prevent the first and second communication circuits from becoming deadlocked.

In various applications, the first and second communication circuits may perform functions in addition to communication and may communicate using various communication protocols. In one possible application, the first communication circuit 110 may be a cache coherent interconnect that is configured to maintain consistency between data stored in a cache 150 of a processing circuit 140 and data stored in a memory 160. The processing circuit 140, cache 150, and memory 160 (illustrated with dashed lines) are shown in FIG. 1 to facilitate discussion of an example application and are not required for some other implementations of the system.

In the example cache coherent interconnect application, the first communication circuit may read/snoop, modify/write-back data values in the cache 150 and memory 160 in response to receiving a read request on data port 112. For instance, in response to receiving a read request indicating a memory address of the memory 140 that is cached by the cache 150, the first communication circuit 110 may retrieve a data value corresponding to the memory address from the cache. The first communication circuit 110 may use the AXI coherency extension (ACE) to communicate data with the memory 160 and cache 150 and maintain cache coherency.

Without buffering of the non-posted writes by the bridge circuit 120, deadlock could occur between a first AXI communication circuit (e.g., 110) and second PCIe communication circuits (e.g., 130). The following example demonstrates how deadlock can arise and be prevented in the system shown in FIG. 1:

1) A memory address (X) of memory 160 is cached in cache 150.
2) The second communication circuit 130 performs an upstream write (A) to the cached memory address (X).
3) The processing circuit 140 performs a downstream non-posted write (B) to the second communication circuit 130. This non-posted write (B) requires completion of the upstream write (A) before the second communication circuit 130 can provide an acknowledgement (C) to complete the non-posted write (B).
4) The data port 112 of the first communication circuit becomes blocked (e.g., by a pending downstream read/write request (D) that cannot be accepted by the bridge 120 due to the non-posted write (B).
5) Independent of the previous steps, the cache 150 may trigger write-back (E) of the cached address (X) to the memory.
6) Write-back (E) is scheduled behind the non-posted write (A).
7) The upstream write (A) causes the first communication circuit 110 to snoop (F) the cached address (X).

In the above scenario, the snoop (F) of address (X) will not be acknowledged until previous write-back (E) of address (X) completes. Write-back (E) will not complete until the non-posted write (B) makes forward progress so the read/write request (D) can be issued by the first communication circuit 110. The non-posted write (B) cannot complete until the upstream write (A) completes, which is waiting on the snoop (F). As none of these transactions can make progress, the communication circuits are in deadlock. By buffering downstream read/write requests, the bridge circuit may continue to accept new read/write transactions, while waiting for the non-posted write to complete. Accordingly, the first communication circuit is not blocked by read/write request D, can perform write-back (E) of address (X), and perform snoop (F) to complete upstream write A—thereby breaking the deadlock.

As indicated above, deadlock may be avoided by buffering all downstream read/write transactions. The bridge circuit 120 may prevent deadlock, without buffering all of the downstream read/write transactions. In one or more implementations, the bridge circuit 120 is configured to buffer only non-posted writes from the first communication circuit 130 to the second communication circuit 170 in a buffer circuit (not shown in FIG. 1). The non-posted writes may be buffered in a first-in-first-out (FIFO) buffer, for example. The bridge circuit 120 provides other downstream read/write transactions to the second communication circuit 130 without buffering. This reduces the number of data transactions that need to be buffered, and allows the buffer size to be reduced, in comparison to buffering all downstream data transactions. In some implementations, the buffer circuit is configured to store at least the maximum number of non-posted writes that may be pending at a given time. For instance, if the bridge circuit and the second communication circuit are configured to complete a non-posted write within a first period of time, the buffer circuit may be configured to buffer at least a maximum number of non-posted write requests that may be issued by the first communication circuit within the first time period. As the number of non-posted writes may be significantly less than the total number of posted and non-posted writes, the buffer size may made less than that needed to buffer the maximum number of posted and non-posted writes that may be issued within the first time period.

The bridge circuit 120 may prioritize posted writes over pending non-posted writes that are buffered by the bridge circuit. This allows the bridge circuit to guarantee progress of posted writes. Moreover, the posted writes may utilize an otherwise idle downstream channel—thereby increasing throughput.

It is understood that in various applications, the first and second communication circuit 110 and 130 may be subject to other deadlock scenarios arising from a downstream channel being blocked by non-posted writes. The buffering of non-posted writes by the bridge circuit 120, similarly serve to avoid deadlock in such scenarios.

Figure 3:
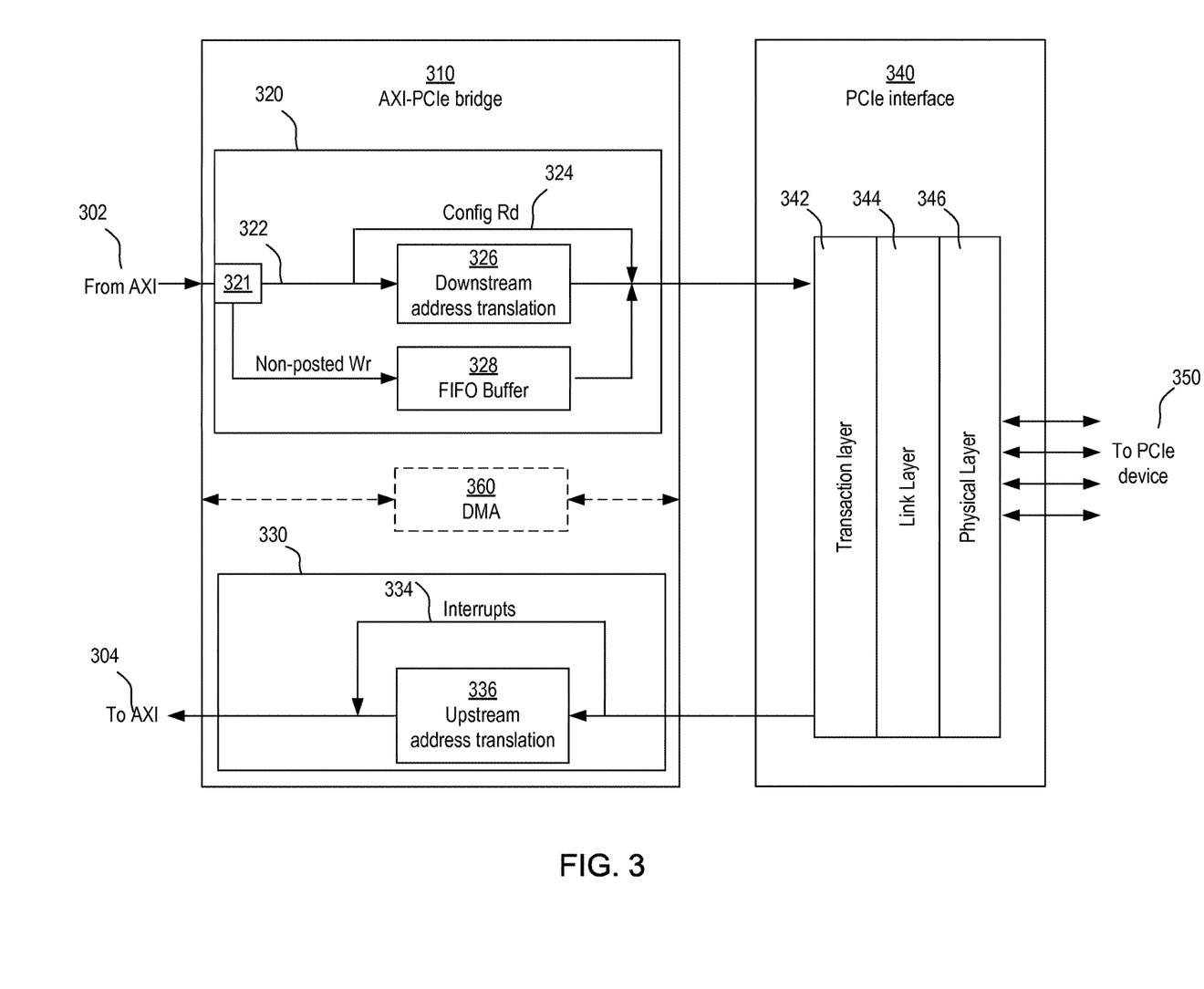
FIG. 3 shows an AXI-PCIe bridge circuit, consistent with one or more implementations.

FIG. 3 shows an AXI-PCIe bridge circuit consistent with one or more implementations. The AXI-PCIe bridge circuit 310 is configured to communicate data between an AXI communication circuit (not shown in FIG. 3) and a PCIe interface 340. The PCIe interface 340 initiates data transactions 350 with a PCIe device (not shown) connected thereto according to the PCIe communication protocols. PCIe is a layered protocol, consisting of a transaction layer 342, a data link layer 344, and a physical layer 346. The transaction layer 342 initiates and maintains packet based transactions using a packet-based split-transaction (with request and responses). The data link layer 344 provides sequence numbering and cyclic redundancy check (CRC) for transmission of the data packet. The physical layer 346 transmits and receives data using a number of data lanes, each including a transmit pair of signal lines and a receive pair of signal lines.

The AXI-PCIe bridge circuit 310 includes a downstream circuit 320 for communicating downstream data 302 from the AXI communication circuit to the PCIe interface 340. Non-posted writes are communicated by the AXI-PCIe bridge circuit 310 to the PCIe interface 340 via a first-in-first-out (FIFO) buffer 328. Other data transactions (posted read/writes and non-posted reads) are communicated by the AXI-PCIe bridge circuit 310 to the PCIe interface 340 via a data path 322 that bypasses the FIFO buffer 328. As shown in FIG. 3, the downstream circuit may include an address translation circuit 326 configured to perform translation between addresses used by the AXI protocol (e.g., address of the AXI-PCIe bridge circuit 310 on an AXI data bus) and addresses used for PCIe devices connected to the PCIe interface 340. It should be noted that for PCIe, address translation is not required for config reads/writes (config writes are non-posted) because they access configuration registers of the devices. Accordingly, non-posted reads may bypass the address translation circuit 326 via data path 324.

In some implementations, the AXI-PCIe bridge circuit 310 includes an input circuit 321 that identifies non-posted writes in downstream data 302, and routes the non-posted writes to the FIFO buffer 328. In some implementations, the input circuit 321 may determine whether or not a write request is a posted write or a non-posted write based on the destination address in the write request. If the destination address is in the range of configuration address space, then the write request is determined to be a non-posted write.

The AXI-PCIe bridge circuit 310 also includes an upstream circuit 330 for communicating upstream data 304 from the PCIe interface 340 to the AXI communication device. The upstream circuit 330 includes an address translation circuit 336 configured to perform translation between addresses used by the PCIe devices and those used by the AXI protocol. Similar to the downstream circuit 320, translation circuit 336 does not need to perform address translation for some upstream data, such as interrupts. Upstream data that does not require address translation may be communicated to the AXI communication circuit via data path 334, which bypasses the address translation circuit 336.

FIG. 3 is not intended to illustrate all the circuits that may be included in an AXI-PCIe bridge circuit, and are not intended to exclude other circuits from being included in various implementations. Rather, the disclosed circuits may be adapted to include additional circuits to perform various other functions. For example, in some implementations, the AXI-PCIe bridge circuit 310 may include a direct memory access (DMA) circuit 360 that may be used to provide direct access to addresses used by one of the protocols without address translation. Various implementations may additionally or alternatively, include various other circuits.

Figure 4:
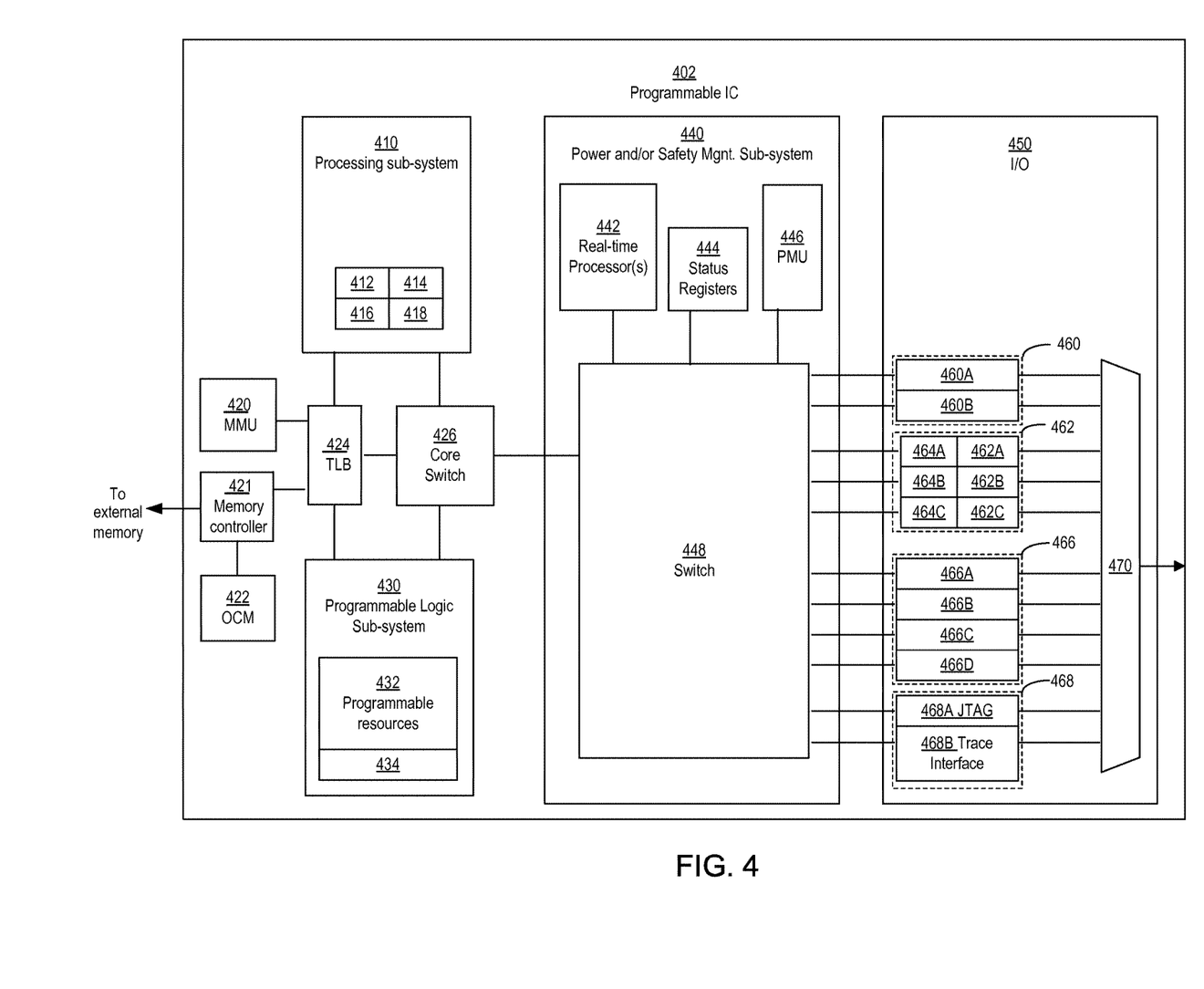
FIG. 4 shows a programmable IC that may be configured consistent with one or more implementations.

FIG. 4 shows a programmable IC 402 that may be configured in accordance with one or more implementations. The programmable IC may also be referred to as a System On Chip (SOC), which includes a processing sub-system 410 and a programmable logic sub-system 430. The processing sub-system 410 may be programmed to implement a software portion of the user design, via execution of a user program. The program may be specified as part of a configuration data stream or may be retrieved from an on-chip or off-chip data storage device. The processing sub-system 410 may include various circuits 412, 414, 416, and 418 for executing one or more software programs. The circuits 412, 414, 416, and 418 may include, for example, one or more processor cores, floating point units (FPUs), an interrupt processing unit, on chip-memory, memory caches, and/or cache coherent interconnect.

The programmable logic sub-system 430 of the programmable IC 402 may be programmed to implement a hardware portion of a user design. For instance, the programmable logic sub-system may include a number of programmable resources 432, which may be programmed to implement a set of circuits specified in a configuration data stream. The programmable resources 432 include programmable interconnect circuits, programmable logic circuits, and configuration memory cells. The programmable logic implements the logic of a user design using programmable elements that can include, for example, function generators, registers, arithmetic logic, and so forth. Programmable interconnect circuits may include a large number of interconnect lines of varying lengths interconnected by programmable interconnect points (PIPs).

The programmable resources 432 may be programmed by loading a configuration data stream into the configuration memory cells, which define how the programmable interconnect circuits and programmable logic circuits are configured. The collective states of the individual memory cells then determine the function of the programmable resources 432. The configuration data can be read from memory (e.g., from an external PROM) or written into the programmable IC 402 by an external device. In some implementations, configuration data may be loaded into configuration memory cells by a configuration controller 434 included in the programmable logic sub-system 430. In some other implementations, the configuration data may be loaded into the configuration memory cells by a start-up process executed by the processor sub-system 410.

The programmable IC 402 may include various circuits to interconnect the processing sub-system 410 with circuitry implemented within the programmable logic sub-system 430. In this example, the programmable IC 402 includes a core switch 426 that can route data signals between various data ports of the processing sub-system 410 and the programmable logic sub-system 430. The core switch 426 may also route data signals between either of the programmable logic or processing sub-systems 410 and 430 and various other circuits of the programmable IC, such as an internal data bus. Alternatively or additionally, the processing sub-system 410 may include an interface to directly connect with the programmable logic sub-system—bypassing the core switch 426. Such an interface may be implemented, for example, using the AMBA AXI Protocol Specification (AXI) as published by ARM.

In some implementations, the processing sub-system 410 and the programmable logic sub-system 430 may also read or write to memory locations of an on-chip memory 422 or off-chip memory (not shown) via memory controller 421. The memory controller 421 can be implemented to communicate with one or more different types of memory circuits including, but not limited to, Dual Data Rate (DDR) 2, DDR3, Low Power (LP) DDR2 types of memory, whether 16-bit, 32-bit, 16-bit with ECC, etc. The list of different memory types with which memory controller 421 is able to communicate is provided for purposes of illustration only and is not intended as a limitation or to be exhaustive. As shown in FIG. 4, the programmable IC 402 may include a memory management unit 420 and translation look-aside buffer 424 to translate virtual memory addresses used by the sub-systems 410 and 430 to physical memory addresses used by the memory controller 421 to access specific memory locations.

The programmable IC may include an input/output (I/O) sub-system 450 for communication of data with external circuits. The I/O sub-system 450 may include various types of I/O devices or interfaces including for example, flash memory type I/O devices, higher performance I/O devices (e.g., PCIe), lower performance interfaces, debugging I/O devices, and/or RAM I/O devices.

The I/O sub-system 450 may include one or more flash memory interfaces 460 illustrated as 460A and 460B. For example, one or more of flash memory interfaces 460 can be implemented as a Quad-Serial Peripheral Interface (QSPI) configured for 4-bit communication. One or more of flash memory interfaces 460 can be implemented as a parallel 8-bit NOR/SRAM type of interface. One or more of flash memory interfaces 460 can be implemented as a NAND interface configured for 8-bit and/or 16-bit communication. It should be appreciated that the particular interfaces described are provided for purposes of illustration and not limitation. Other interfaces having different bit widths can be used.

The I/O sub-system 450 can include one or more interfaces 462 providing a higher level of performance than memory interfaces 460. Each of interfaces 462A-462C can be coupled to a DMA controller 464A-464C respectively. For example, one or more of interfaces 462 can be implemented as a Universal Serial Bus (USB) type of interface. One or more of interfaces 462 can be implemented as a gigabit Ethernet type of interface. One or more of interfaces 462 can be implemented as a Secure Digital (SD) type of interface.

The I/O sub-system 450 may also include one or more interfaces 466 such as interfaces 466A-466D that provide a lower level of performance than interfaces 462. For example, one or more of interfaces 466 can be implemented as a General Purpose I/O (GPIO) type of interface. One or more of interfaces 466 can be implemented as a Universal Asynchronous Receiver/Transmitter (UART) type of interface. One or more of interfaces 466 can be implemented in the form of a Serial Peripheral Interface (SPI) bus type of interface. One or more of interfaces 466 can be implemented in the form of a Controller-Area-Network (CAN) type of interface and/or an I²C type of interface. One or more of interfaces 466 also can be implemented in the form of a Triple Timer Counter (TTC) and/or a Watchdog Timer (WDT) type of interface.

The I/O sub-system 450 can include one or more debug interfaces 468 such as processor JTAG (PJTAG) interface 468A and a trace interface 468B. PJTAG interface 468A can provide an external debug interface for the programmable IC 402. Trace interface 468B can provide a port to receive debug, e.g., trace, information from the processing sub-system 410 or the programmable logic sub-system 430.

As shown, each of interfaces 460, 462, 466, and 468 can be coupled to a multiplexer 470. Multiplexer 470 provides a plurality of outputs that can be directly routed or coupled to external pins of the programmable IC 402, e.g., balls of the package within which the programmable IC 402 is disposed. For example, I/O pins of programmable IC 402 can be shared among interfaces 460, 462, 466, and 468. A user can configure multiplexer 470, via a configuration data stream, to select which of interfaces 460-468 are to be used and, therefore, coupled to I/O pins of programmable IC 402 via multiplexer 470. The I/O sub-system 450, may also include a fabric multiplexer I/O (FMIO) interface (not shown) to connect interfaces 462-468 to programmable logic circuits of the programmable logic sub-system. Additionally or alternatively, the programmable logic sub-system 430 can be configured to implement one or more I/O circuits within programmable logic. In some implementations, the programmable IC 402 may also include a sub-system 440 having various circuits for power and/or safety management. For example, the sub-system 440 may include a power management unit 446 configured to monitor and maintain one or more voltage domains used to power the various sub-systems of the programmable IC 402. In some implementations, the power management unit 446 may disable power of individual sub-systems, when idle, to reduce power consumption, without disabling power to sub-systems in use.

The sub-system 440 may also include safety circuits to monitor the status of the sub-systems to ensure correct operation. For instance, the sub-system 440 may include one or more real-time processors 442 configured to monitor the status of the various sub-systems (e.g., as indicated in status registers 444). The real-time processors 442 may be configured to perform a number of tasks in response to detecting errors. For example, for some errors, the real-time processors 442 may generate an alert in response to detecting an error. As another example, the real-time processors 442 may reset a sub-system to attempt to restore the sub-system to correct operation. The sub-system 440 includes a switch network 448 that may be used to interconnect various sub-systems. For example, the switch network 448 may be configured to connect the various sub-systems 410, 430, and 440 to various interfaces of the I/O sub-system 450. In some applications, the switch network 448 may also be used to isolate the real-time processors 442 from the sub-systems that are to be monitored. Such isolation may be required by certain application standards (e.g., IEC-61508 SIL3 or ISO-26262 standards) to ensure that the real-time processors 442 are not affected by errors that occur in other sub-systems.

The methods and circuits are thought to be applicable to a variety of systems and applications. Other aspects and features will be apparent to those skilled in the art from consideration of the specification. For example, though aspects and features may in some cases be described in individual figures, it will be appreciated that features from one figure can be combined with features of another figure even though the combination is not explicitly shown or explicitly described as a combination. It is intended that the specification and drawings be considered as examples only, with a true scope of the invention being indicated by the following claims.

What is claimed is:

1. A system, comprising:
    a first communication circuit configured to communicate data over a first data port using a first communication protocol;
    a second communication circuit configured to communicate data over a second data port using a second communication protocol that processes read and write requests in an order that the read and write requests are received; and
    a bridge circuit configured to communicate data between the first data port of the first communication circuit and the second data port of the second communication circuit, wherein the bridge circuit is configured to communicate non-posted write requests to the second communication circuit, and communicate posted write requests to the second communication circuit via a communication path that does not buffer a plurality of posted write requests and bypasses a buffer circuit while the plurality of non-posted write requests are buffered;
    wherein the first communication circuit transmits posted write requests and non-posted write requests to the bridge circuit and the bridge circuit includes a circuit configured to determine that a non-posted write request from the first communication circuit is a non-posted write request based on a destination address in the write request, and determine that a posted write request from the first communication circuit is a posted write request based on a destination address in the write request.

2. The system of claim 1, further comprising:
a memory connected to the first communication circuit;
a processing circuit coupled to the first communication circuit and having a cache for caching data from the memory; and
wherein:
the first communication circuit is further configure to, in response to receiving a read request on the first data port and indicating a memory address of the memory that is cached by the cache, retrieve a data value corresponding to the memory address from the cache; and
deadlock is prevented for a write-back of a data value from the cache being blocked by pending non-posted writes by the communicating of the non-posted writes to the second communication circuit via the buffer circuit.

3. The system of claim 1, wherein the bridge circuit is further configured to prioritize posted writes to the second communication circuit over non-posted writes to the second communication circuit.

4. The system of claim 1, wherein the buffer circuit is a first-in-first-out (FIFO) buffer.

5. The system of claim 1, wherein the bridge circuit is configured to communicate data with the first communication circuit using the first communication protocol and communicate data with the second communication circuit using the second communication protocol.

6. The system of claim 1, wherein the bridge circuit includes an address translation circuit configured and arranged to perform address translation for posted read and write requests between the first communication circuit and the second communication circuit.

7. The system of claim 6, wherein the bridge circuit includes a direct memory access circuit configure to provide read and write requests from one of the first or second communication circuits access to another one of the first or second communication circuits on a data path that bypasses the address translation circuit.

8. The system of claim 1, wherein:
the bridge circuit and the second communication circuit are configured to, in response to receiving a non-posted write from the first communication circuit, provide an acknowledgement to the non-posted write within a first period of time; and
the buffer circuit is configured to buffer at least a maximum number of non-posted write requests that may be issued by the first communication circuit in the first time period.

9. The system of claim 8, wherein:
the buffer circuit is configured to buffer less than the maximum number of non-posted and posted write requests that may be issued by the first communication circuit in the first time period.

10. A method for data communication, comprising:
using a first communication circuit, communicating data in posted write requests and non-posted write requests over a first data port using a first communication protocol;
using a second communication circuit, communicating data over a second data port using a second communication protocol that processes read and write requests in an order that the read and write requests are received;
determining by a bridge circuit, in response to receiving the posted write requests and non-posted write requests from the first communication circuit, whether a received posted write request is a posted write request and whether a received non-posted write request is a non-posted write request based on a destination address in the write request;
communicating by the bridge circuit, non-posted writes from the first communication circuit to the second communication circuit via a buffer circuit of the bridge circuit that buffers a plurality of non-posted writes in response to the write request being a non-posted write request; and
communicating by the bridge circuit, posted writes from the first communication circuit to the second communication circuit via a communication path of the bridge circuit that does not buffer a plurality of posted writes and bypasses the buffer circuit while the plurality of non-posted writes are buffered in response to the write request being a posted write request.

11. The method of claim 10, wherein the communicating of posted write requests from the first communication circuit to the second communication circuit includes communicating the posted write requests to the second communication circuit prior to communicating non-posted writes that are stored in the buffer circuit.

12. The method of claim 10, further comprising:
using the first communication circuit to maintain data coherency between data stored in a memory connected to the first communication circuit and a cache connected to the first communication circuit.

13. The method of claim 10, wherein the buffer circuit is a first-in-first-out (FIFO) buffer.

14. The method of claim 10, further comprising, performing address translation for posted read and write requests between the first communication circuit and the second communication circuit.

15. The method of claim 10, further comprising:
in response to determining that the write request is a non-posted write request, routing the non-posted write request to the buffer circuit; and
in response to determining that the write request is a posted write, routing the posted write request to the communication path that bypasses the buffer circuit.

16. A system, comprising:
a first communication circuit being configured to communicate data in posted write requests and non-posted write requests over a first data port using a first communication protocol;
a second communication circuit configured to communicate data over a second data port using a second communication protocol that processes read and write requests in an order that the read and write requests are received; and
a bridge circuit, including:
a first communication path between the first and second data ports and that includes a buffer circuit that buffers a plurality of non-posted write requests;
a second communication path between the first and second data ports and that does not buffer a plurality of posted write requests and bypasses the buffer circuit while the plurality of non-posted write requests are buffered; and
an input circuit configured to:
determine that a non-posted write request from the first communication circuit is a non-posted write request based on a destination address indicated in the non-posted write request;

determine that a posted write request from the first communication circuit is a posted write request based on a destination address indicated in the posted write request;
in response to determining the write request is a non-posted write request, provide the non-posted write request to the second communication circuit via the second communication path; and
in response to determining the write request is a posted write request, provide the posted write to the second communication circuit via the second communication path.

\* \* \* \* \*